United States Patent
Uehara

(10) Patent No.: US 6,392,132 B2
(45) Date of Patent: May 21, 2002

(54) MUSICAL SCORE DISPLAY FOR MUSICAL PERFORMANCE APPARATUS

(75) Inventor: Haruki Uehara, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/886,758

(22) Filed: Jun. 20, 2001

(30) Foreign Application Priority Data

Jun. 21, 2000 (JP) .......................................... 12-186920

(51) Int. Cl.$^7$ ............................................... G09B 15/02
(52) U.S. Cl. ................... 84/477 R; 84/483.1; 84/483.2; 84/600; 84/609; 84/DIG. 6
(58) Field of Search .................. 84/600–604, 609–612, 84/615–616, 649–654, 477 R, 478, 483.1, 483.2, 484, DIG. 6

(56) References Cited

U.S. PATENT DOCUMENTS

| | | | | |
|---|---|---|---|---|
| 5,272,273 A | * | 12/1993 | Watanuki et al. | 84/649 |
| 5,563,358 A | * | 10/1996 | Zimmerman | 84/477 R |
| 5,693,903 A | * | 12/1997 | Heidorn et al. | 84/609 |
| 5,913,259 A | * | 6/1999 | Grubb et al. | 84/610 |
| 6,134,526 A | * | 10/2000 | Kim | 84/634 |

* cited by examiner

Primary Examiner—Marlon T. Fletcher
(74) Attorney, Agent, or Firm—Morrison & Foerster LLP

(57) ABSTRACT

A musical score display apparatus installed in an electronic musical instrument such as a player piano is designed to automatically display and change over images of electronic musical score data on the screen. A user's voice (or vocalization) is input by means of a microphone and an A/D converter, so that the input voice is subjected to signal processing to produce voice data. The voice data is then subjected to voice analysis such as phoneme analysis to determine an arrangement of phonemes that are included in the input voice and that highly matches one of prescribed words listed in advance in a word dictionary. Recognition data is created based on the arrangement of the phonemes and is subjected to command interpretation with reference to prescribed commands that are listed in advance in a command database. For example, the command database registers a command 'NEXT' for designating the next page of the musical score to be displayed on the screen and a command 'BACK' for designating the previous page of the musical score to be displayed on the screen. Herein, one of the commands that highly matches the recognition data is chosen and is used to control images of the musical score being displayed on the screen. In addition, it is possible to detect a tone volume or a tempo from the input voice. Thus, musical performance is automatically controlled based on the electronic musical score data in response to the detected tone volume or tempo.

16 Claims, 10 Drawing Sheets

| ELECTRONIC MUSICAL SCORE DATA | INTERVAL DATA | 1 | 2 | 0 | +1 | −3 | +2 | 3 | 1 | 4 | 2 |
|---|---|---|---|---|---|---|---|---|---|---|---|
| | RHYTHM DATA | 0.5 | 3 | 2 | 4 | 1 | 0.25 | 3 | 0.5 | 2 | 1 |
| | SONG DATA | ラ | ラ | ラ | ト | ナ | カ | イ | ラ | ラ | ラ |
| | PAGE DATA | 2 | | | | | | | | | |
| | ⋮ | ⋮ | | | | | | | | | |

MUSICAL SCORE DISPLAY FOR MUSICAL PERFORMANCE APPARATUS

BACKGROUND OF THE INVENTION

1. Field of the Invention

This invention relates to musical score displays that display musical scores on screens for musical performance apparatuses such as player pianos.

2. Description of the Related Art

Recently, electronic musical instruments such as player pianos install functions of displaying musical scores on screens of displays such as liquid crystal displays.

FIG. 12 shows an example of an image of electronic musical score data that are displayed on a screen of a display panel of a player piano. Herein, three staves, notes and musical symbols in musical notation are displayed in an upper area of the screen, while graphical images and control buttons are displayed in a lower area of the screen.

A performer (or user) who plays the player piano operates the control buttons displayed on the screen to change over images of the musical score, so that the next page of the musical score is displayed on the screen.

If the performer uses both of his/her hands to play the player piano, it is necessary for the performer to temporarily stop playing the player piano and change over the image of the screen. Alternatively, the performer should rapidly change over the image of the screen even if the performer does not break the musical performance on the player piano. In other words, the conventional player piano needs manual operations for changing over images of the musical score on the screen, hence, the performer feels difficulty in continuously playing the player piano because the performer cannot concentrate completely on playing the musical performance.

Other than the aforementioned manual operations for changing over images of the musical score on the screen, the conventional player piano needs manual operations, using the control buttons, for setting or changing tone volumes and tempos in performance. To set or change them, the performer may have a similar problem due to intermittent suspension of the musical performance on the player piano.

SUMMARY OF THE INVENTION

It is an object of the invention to provide a musical performance apparatus installing a musical score display apparatus whose operations can be easily controlled by voice commands spoken by a user.

The present invention provides a musical score display apparatus that is installed in an electronic musical instrument such as a player piano and that is designed to automatically display and change over images of electronic musical score data on the screen. A user's vocalization (or user's voice) is input by means of a microphone and an A/D converter, so that the input voice is subjected to signal processing to produce voice data. The voice data is then subjected to voice analysis such as phoneme analysis to determine an arrangement of phonemes that are included in the input voice and that highly match one of the prescribed words listed in advance in a word dictionary. Recognition data is created based on the arrangement of the phonemes and is subjected to command interpretation with reference to prescribed commands that are listed in advance in a command database. For example, the command database registers a command 'NEXT' for designating a next page of the musical score to be displayed on the screen and a command 'BACK' for designating a previous page of the musical score to be displayed on the screen. Herein, one of the commands that highly matches the recognition data is chosen and is used to control images of the musical score being displayed on the screen.

The arrangement of the phonemes can be compared with words of a song to designate a prescribed position of the musical score, hence, the corresponding page of the musical score is automatically displayed on the screen.

Other than the arrangement of the phonemes, it is possible to extract a string of pitches, by which retrieval is performed through the electronic musical score data to find a string of notes corresponding to the extracted pitches respectively. Hence, the corresponding page of the musical score is automatically displayed on the screen.

In addition, it is possible to detect a tone volume or a tempo from the input voice. Thus, musical performance is automatically controlled based on the electronic musical score data in response to the detected tone volume or tempo.

BRIEF DESCRIPTION OF THE DRAWINGS

These and other objects, aspects and embodiments of the present invention will be described in more detail with reference to the following drawing figures, of which.

DESCRIPTION OF THE PREFERRED EMBODIMENTS

This invention will be described in further detail by way of examples with reference to the accompanying drawings.

[A] First Embodiment (1) Configurations of First Embodiment

Figure 1:
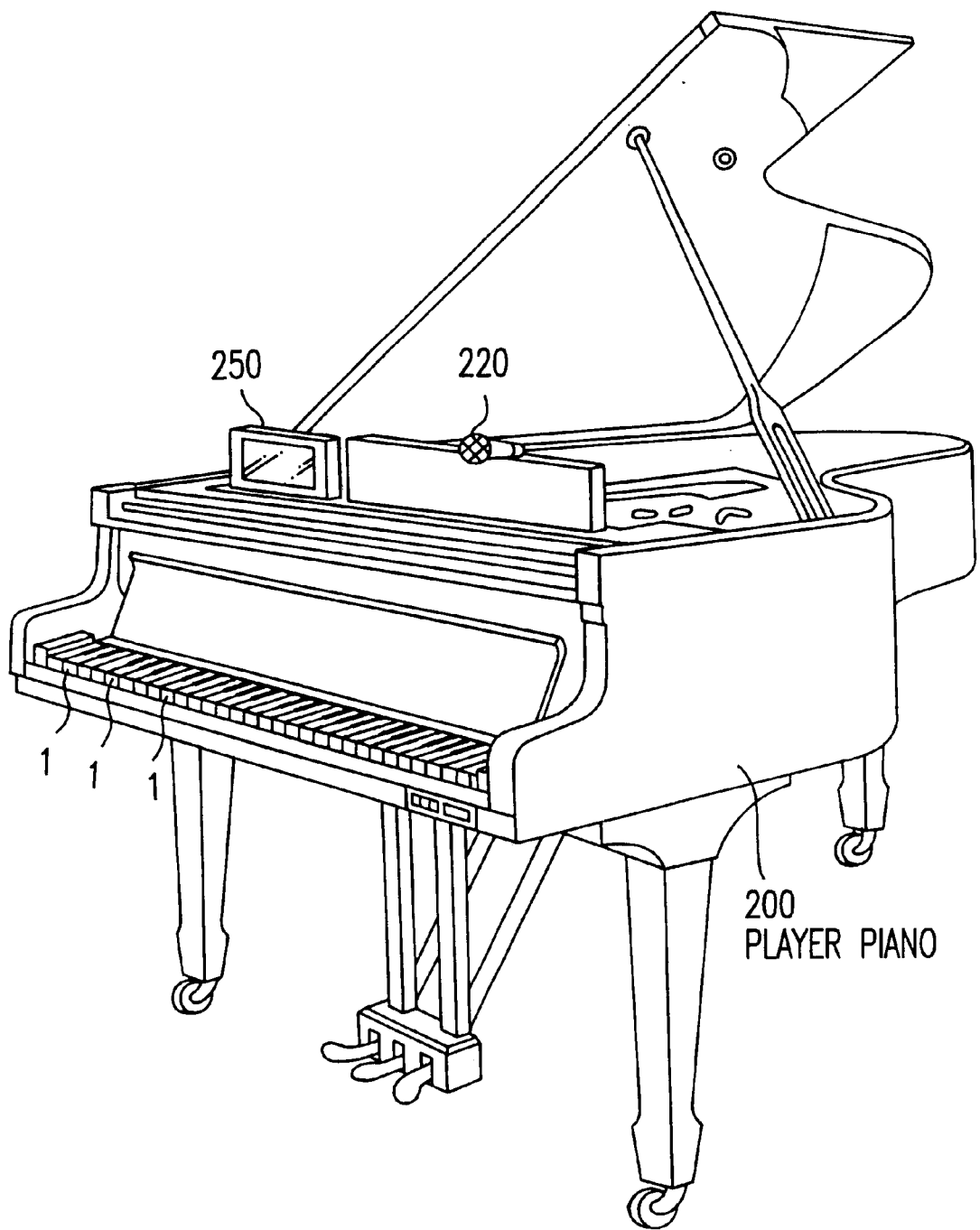
FIG. 1 is a perspective view showing an appearance of a player piano that installs a musical score display apparatus in accordance with a first embodiment of the invention.
Figure 2:
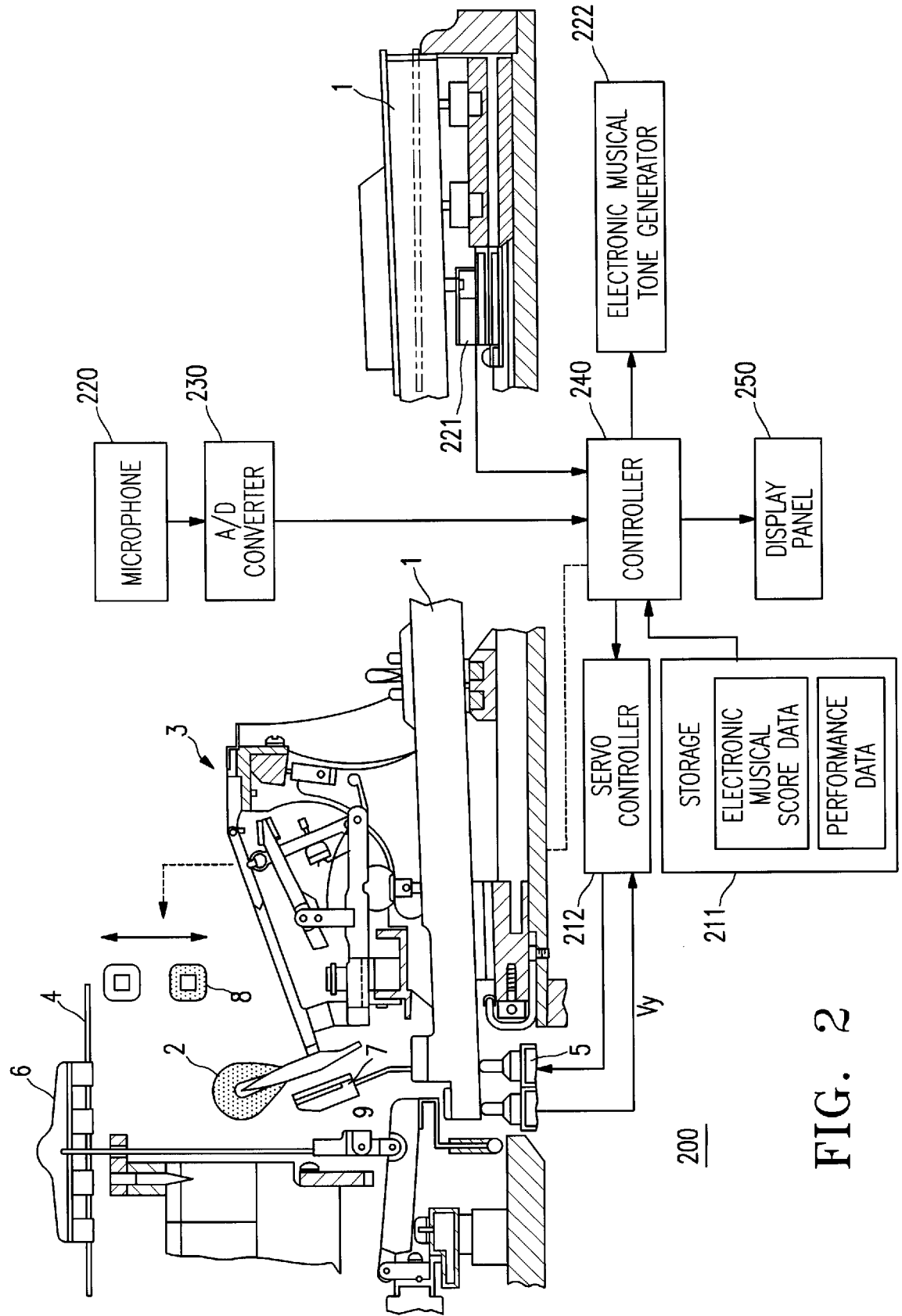
FIG. 2 shows mechanical configurations and electrical configurations provided inside of the player piano shown in FIG. 1.

FIG. 1 shows an appearance of a player piano 200, internal configurations of which are shown in FIG. 2.

First, a mechanical configuration of the player piano 200 will be described with reference to FIG. 2. The player piano 200 provides an action mechanism 3 for transmitting an action (i.e., touch or depression) of a key 1 to a hammer 2, a string 4 being struck by the hammer 2, a solenoid 5 for driving the key 1 to move, a damper 6 for stopping vibration of the string 4, and a mute mechanism containing a stopper 8 for regulating movement of the hammer, wherein the stopper 8 can move in directions of arrows in FIG. 2. Of course, the player piano 200 also provides the known mechanical members that are generally installed in the pianos. For example, the player piano 200 also provides a back check 7 for preventing the hammer 2 from unnecessarily moving or deviating. The present specification excludes description of the aforementioned mechanical members that are not closely related to essential matters of the present embodiment.

Next, an electric configuration of the player piano 200 will be described with reference to FIG. 2, wherein the player piano 200 is basically configured using the general electronic components such as the CPU, ROM and RAM. Namely, a controller 240 performs overall controls on the player piano 200. A servo controller 212 controls a servo mechanism based on control signals output from the controller 240. An electronic musical tone generator 222 generates electronic musical tones based on control signals output from a key sensor 221, which will be described later. A display panel 250 is configured by a liquid crystal display to display images of electronic musical score data on a screen. In addition, a storage unit 211 stores electronic musical score data and performance data therein.

Based on the performance data supplied from the storage unit 211, the controller 240 supplies controls signals to the servo controller 212 in order to control positions of the keys 1 at prescribed times respectively.

Specifically, based on the control signal supplied from the controller 240, the servo controller 212 produces an excitation current, corresponding to the prescribed position of the key 1, to flow across the solenoid 5 corresponding to the key 1. In addition, the servo controller 212 inputs a feedback signal Vy from the solenoid 5. Using such a feedback signal Vy, the servo controller 212 performs a feedback control of the excitation current to be flown across the solenoid 5 corresponding to the key 1. Further, the controller 240 performs a positioning control on the stopper 8 by adequately turning on or off a drive mechanism (not shown).

As described above, based on the performance data supplied from the storage unit 211, the controller 240 performs positioning controls respectively on the solenoids 5 corresponding to the keys 1 by means of the servo controller 212. Thus, it is possible to perform 'mechanical' musical tone generation controls for actually striking the strings 4.

The player piano 200 provides the prescribed number of keys 1, which are respectively coupled with key sensors 221. The key sensors 221 are provided to detect operations of the keys 1 respectively.

The key sensors 221 are arranged beneath lower surfaces of the keys 1, so that they output signals representing variations of states of the keys 1 (namely, depression and release of the keys 1) to the controller 240.

Based on output signals of the key sensors 221, the controller 240 supplies control signals to the electronic musical tone generator 222 to control generation of electronic musical tones. When electronically generating the musical tones in response to operations of the keys 1, the controller 240 stops the hammers 2 striking the strings 4 by performing the aforementioned positioning controls on the stoppers 8. In other words, the controller 240 performs musical tone suppression controls to suppress the musical tones being generated by striking the strings 4. As described above, the player piano 200 provides 'electronic' musical tone generation controls in addition to the 'mechanical' musical tone generation controls that are made by actually striking the strings 4. Herein, the electronic musical tone generation controls are made such that electronic musical tones are controlled in response to the performance data by supplying control signals to the electronic musical tone generator 222, which is configured by a sound source and a speaker (or speakers).

The player piano 200 of the present embodiment also provides a microphone 220 and an analog-to-digital converter (A/D converter) 230.

The microphone 220 has a directivity in a prescribed direction. Therefore, the microphone 220 is mounted on a certain location of the player piano 200 at which it can efficiently pick up the voice of the user (see FIG. 1). The microphone 220 picks us the user's voice and converts it to analog signals. The A/D converter 230 converts the analog signals to digital signals, which are forwarded to the controller 240.

Namely, the controller 240 receives user's voice commands (or user's vocalized commands), which are picked up and supplied thereto by the microphone 220 and the A/D converter 230. Recognizing the user's voice commands, the controller 240 performs image changeover controls for changing over images of the musical score on the screen of the display panel 250. That is, the controller 240 has the image changeover controls in addition to the foregoing performance controls such as the mechanical and electronic musical tone generation controls.

Next, display image controls of the controller 240, which are characterizing features of the present invention, will be described with reference to FIG. 3.

Figure 3:
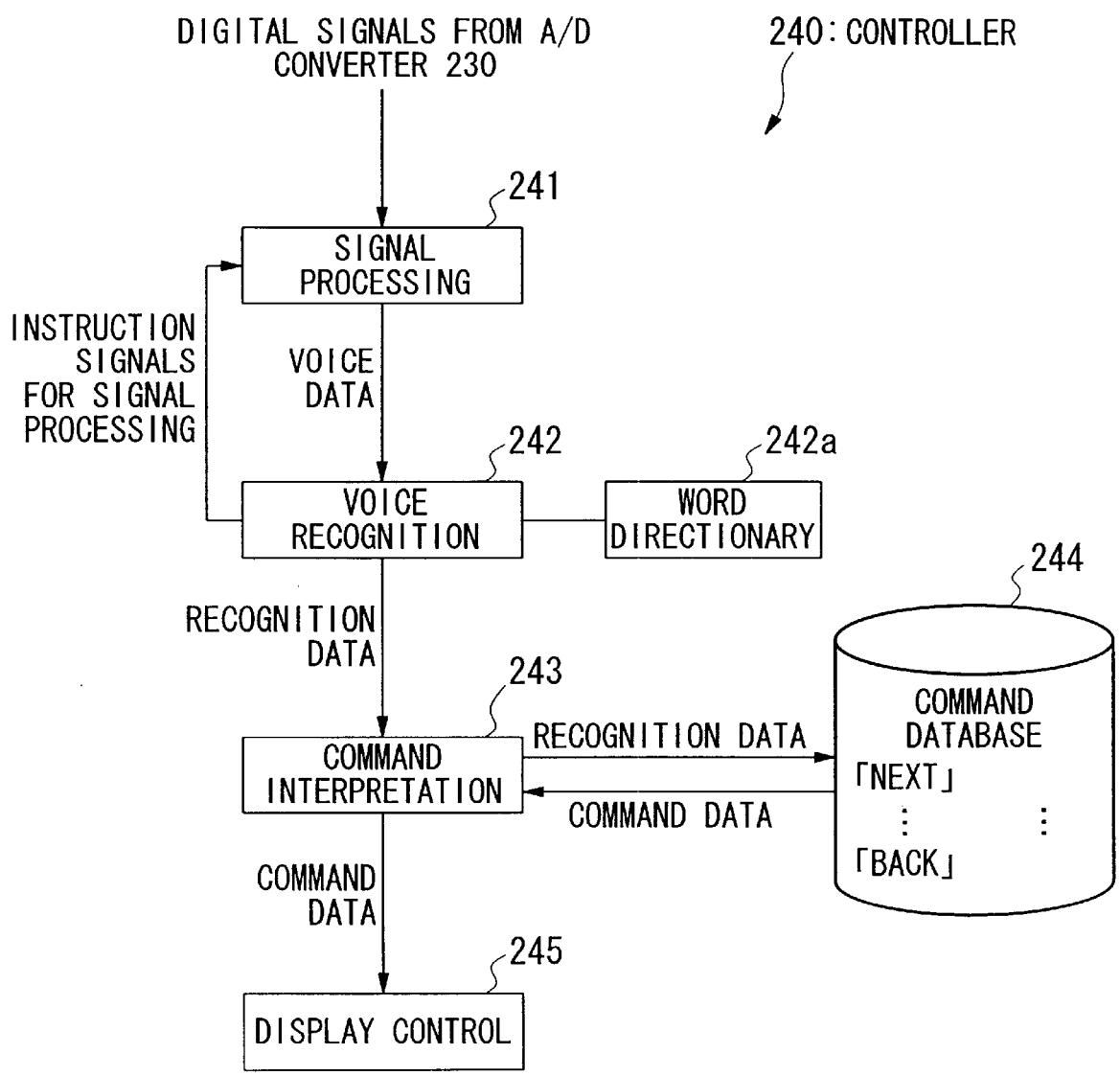
FIG. 3 is a simplified block diagram showing function blocks realized in a controller shown in FIG. 2.

FIG. 3 shows simplified function blocks provided inside of the controller 240. Namely, the controller 240 provides a signal processing block 241, a voice recognition block 242, a command interpretation block 243, a command database 244 and a display control block 245.

The signal processing block 241 performs signal processing on digital signals output from the A/D converter 230, so that voice data are created and are forwarded to the voice recognition block 242. It is possible to change the content of the signal processing in response to instruction signals being supplied from the voice recognition block 242.

The voice recognition block 242 divides the voice data, output from the signal processing block 241, into plural data by units of frames (hereinafter, simply referred to as "frame data"). Sound models are created based on phoneme models, which are registered in advance. Phoneme analysis is performed by comparison between the frame data and sound models, waveforms of which are compared with each other. Thus, the phoneme analysis determines phonemes having high likelihood in which the frame data highly match with the sound models in their waveforms. That is, the voice recognition block 242 effects phoneme analysis processes to provisionally determine arrangements of the phonemes, which are respectively compared with words that are registered in a word dictionary 242*a* in advance. Thus, the voice recognition block 242 chooses the words that highly match with the arrangements of the phonemes. Using those words, the voice recognition block 242 performs syntax analysis using language models. Through the syntax analysis, the voice recognition block 242 determines a sentence (or statement) that can be read in the Japanese language, for example. Then, the voice recognition block 242 produces recognition data representing the determined sentence, which are forwarded to the command interpretation block 243. Incidentally, the word dictionary 242a registers in advance the prescribed words regarding the commands for use in controls of automatic performance of the player piano 200. For example, it registers the words such as "start" and "stop" that instruct start and stop of the automatic performance respectively. In addition, the word dictionary 242a also registers other words regarding the commands for use in changeovers of images of electronic musical score data on the screen. For example, it registers the Japanese words such as ツギ and マエ (i.e., "next" and "back" in English) that instruct the display panel 250 to change over images of the electronic musical score data on the screen. Herein, "TUGI" instructs the display panel 250 to display the next page following the page presently displayed on the screen, while "MAE" instructs the display panel 250 to display the previous page on the screen.

The command interpretation block 243 compares the recognition data output from the voice recognition block 242 with command data representing the prescribed commands that are registered in the command database 244 in advance. Through comparison, the command interpretation block 243 interprets the recognition data to choose the commands that highly match with the recognition data. Herein, the command interpretation block 243 chooses a command having a highest degree of match (namely, a voice input command) and other examples of commands that have relatively high degrees of match. The chosen commands are converted to command data to suit the prescribed data format that can be uniquely interpreted for the display control block 245. The command data are supplied to the display control block 245.

The command database 244 manages the words regarding the commands for changing over images of the electronic musical score data on the screen in correspondence with the command data respectively. Concretely speaking, FIG. 3 shows an example of the content of the command database 244 in which the word "TUGI" for designating the next page of the electronic musical score data to be displayed on the screen is related to the command 'NEXT' for instructing the display panel 250 to display the next page of the electronic musical score data on the screen. In addition, the word "MAE" for designating the previous page of the electronic musical score data to be displayed on the screen is related to the command 'BACK' for instructing the display panel 250 to display the previous page of the electronic musical score data on the screen.

Based on the command data output from the command interpretation block 243, the display control block 245 performs various types of display controls such as changeovers of images of the electronic musical score data to be displayed on the screen of the display panel 250.

(2) Operations of First Embodiment

Next, operations of the player piano 200 will be described with respect to a user's musical performance in accordance with the first embodiment of the invention.

First, the user of the player piano 200 operates an operator console (not shown) to select a musical tune to be performed. Then, the display control block 245 reads from the storage unit 211, electronic musical score display data corresponding to the selected musical tune. The display control block 245 produces electronic musical score data for displaying a first page of the musical score on the screen. The electronic musical score data are supplied to the display panel 250. Thus, the display panel 250 displays the first page of the musical score on the screen.

Figure 4:
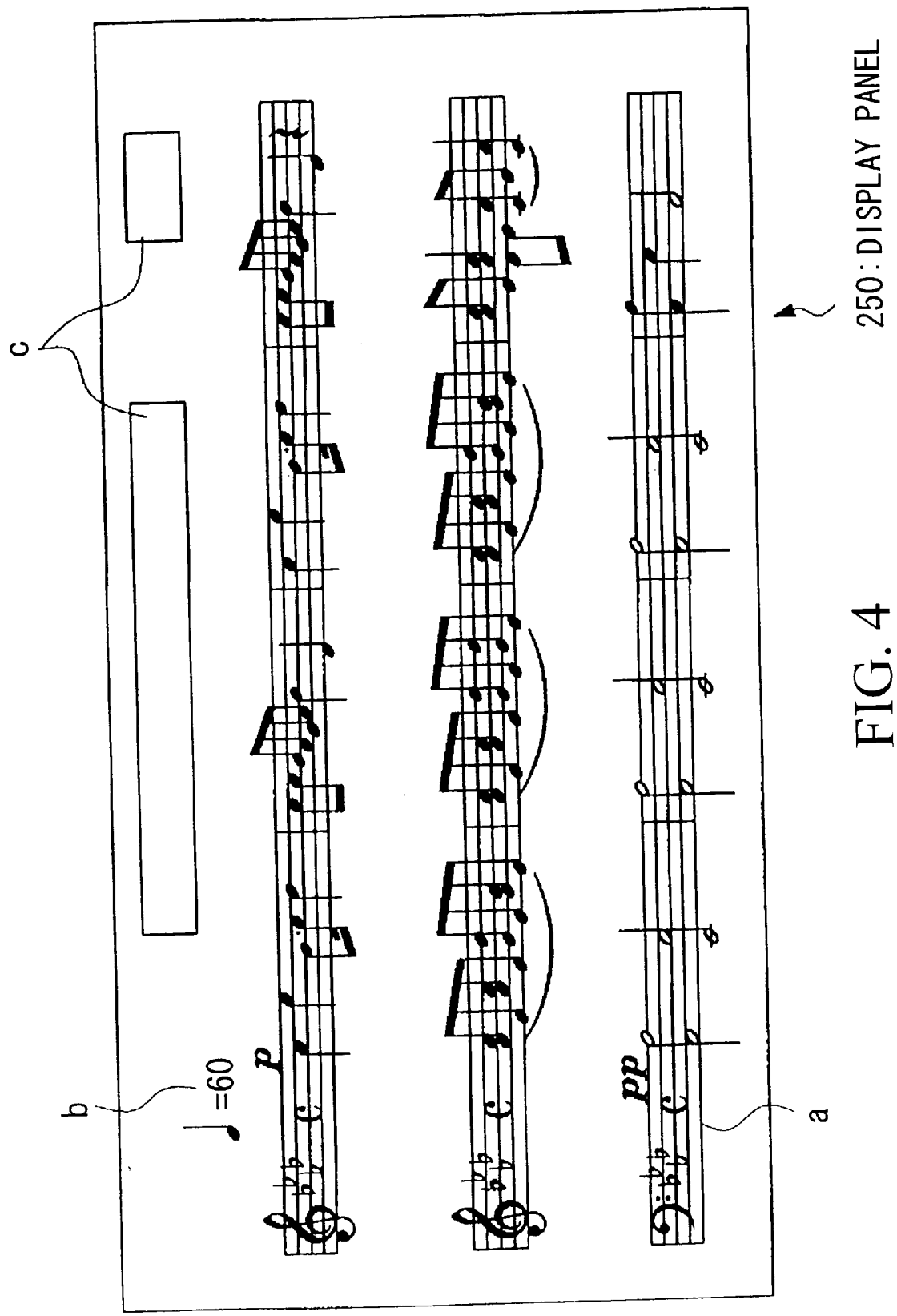
FIG. 4 shows an example of an image of a first page of electronic musical score data being displayed on the screen.

FIG. 4 shows an example of the first page of the musical score being displayed on the screen of the display panel 250.

The display panel 250 displays basically three types of information, namely performance information 'a', tempo information 'b' and title information 'c', on the screen. The information 'a' corresponds to the first page of the musical score showing three staves on which musical symbols and musical notes designating pitches and duration are adequately arranged in the prescribed musical notation. Hence, the user is able to play the player piano 200 with reference to the musical score displayed on the screen.

The tempo information 'b' designates a tempo that the user uses as the standard of velocity in musical performance on the musical score. In the case of FIG. 4, the tempo information b designates a certain performance tempo by which sixty quarter notes are to be played within one minute. Incidentally, the user is able to arbitrarily set or change the performance tempo by operating the operator console. Once the user sets the performance tempo on the screen, the display control block 245 controls the display panel 250 to sequentially flash the notes that the user should play in response to the performance tempo, which is displayed as the tempo information b in an upper left portion of the screen.

The title information 'c' shows the title of the musical tune, the name of a composer, etc. The title information c also contains information representing the present position of the musical score of the musical tune being presently played in accordance with progression of musical performance. For example, the information shows a serial number of the measure that is counted from a first measure of the musical score of the musical tune.

Suppose that the user produces the word "TUGI" on the microphone 220 of the player piano 200 under the condition where the display panel 250 is presently displaying the first page of the musical score on the screen. In that case, the word "TUGI" is picked up by the microphone 220 and is converted to digital signals by the A/D converter 230. Upon receipt of the digital signals, the controller 240 starts voice recognition processes and the like. Concretely speaking, the user's voice is input to the player piano 200 by means of the microphone 220 and A/D converter 230, so that the signal processing block 241 produces the corresponding voice data, which are forwarded to the voice recognition block 242. In the voice recognition block 242, the voice data are subjected to phoneme analysis to provisionally determine an arrangement of phonemes included in the user's voice. The arrangement of the phonemes is compared with the words that are registered in the word dictionary 242a. Thus, the voice recognition block 242 chooses a word that highly matches with the arrangement of the phonemes within the words registered in the word dictionary 242a. The word dictionary 242a coupled with the voice recognition block 242 registers the word "TUGI" that indicates a page migration in the forward direction (namely, page forward) with respect to the electronic musical score data. Therefore, the voice recognition block 242 determines the word "TUGF" based on the phoneme analysis result, so that corresponding recognition data are forwarded to the command interpretation block 243. Upon receipt of the recognition data from the voice recognition block 242, the command interpretation block 243 refers to the command database 244 to make a determination as to which command the recognition data actually means. As described before, the command database 244 stores the word "TUGI" representing the page forward of the electronic musical score data in correspondence with the command NEXT for instructing the page forward of the electronic musical score data on the screen. Therefore, the command interpretation block 243 reads from the command database 244, the command NEXT that corresponds to the recognition data output from the voice recognition block 242. Then, the command NEXT is sent to the display control block 245.

Figure 5:
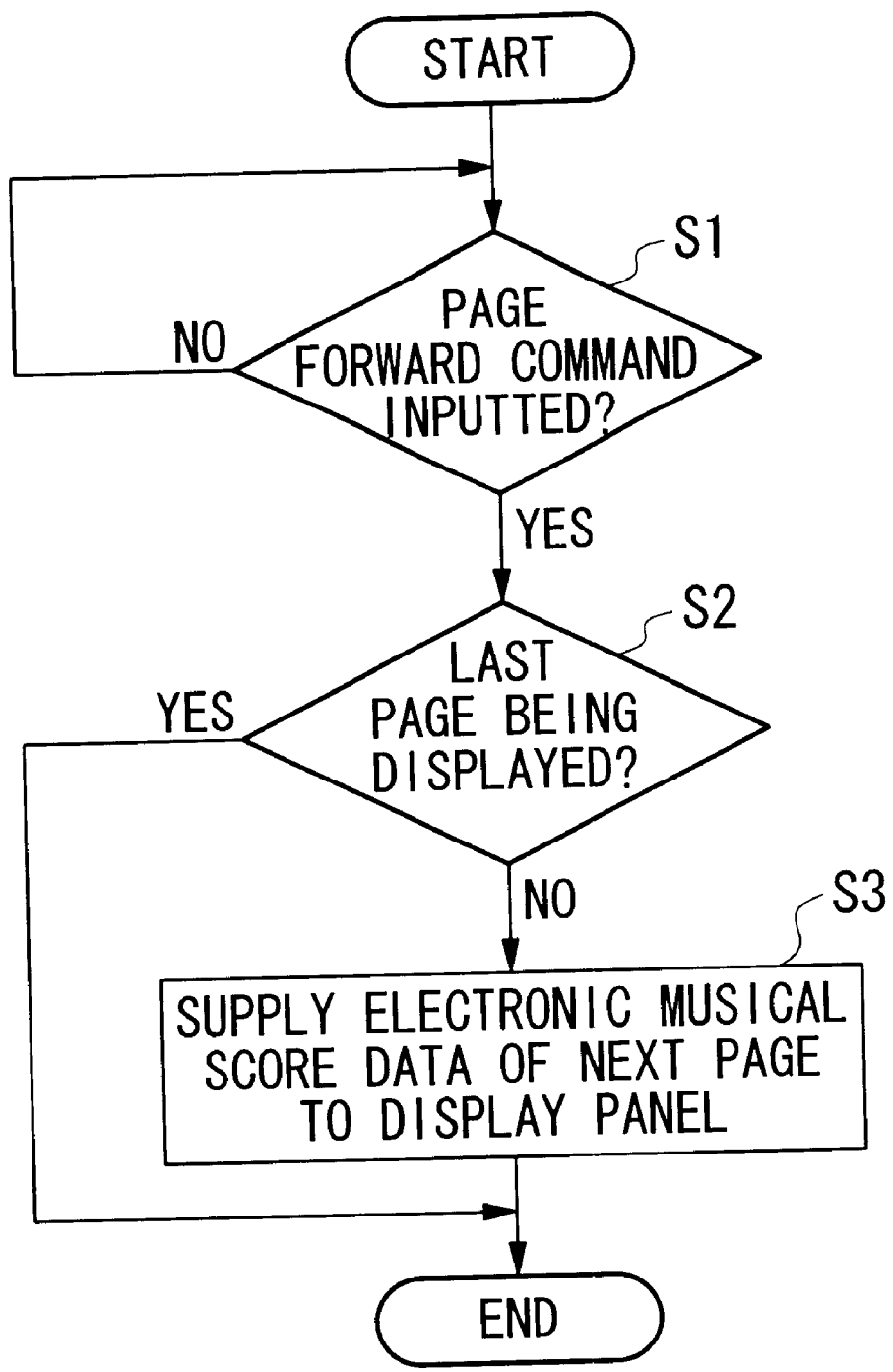
FIG. 5 is a flowchart showing a page forward process being executed by a display control block shown in FIG. 3.

Receiving the command NEXT from the command interpretation block 243, the display control block 245 starts to execute a page forward process shown in FIG. 5. Herein, the flow firstly proceeds to step S1 in which a decision is made as to whether a page forward command 'NEXT' for the electronic musical score data is input or not. If the display control block 245 detects the page forward command NEXT being output from the command interpretation block 243, the flow proceeds to step S2 in which a decision is made as to whether the last page of the musical score is presently displayed on the screen or not. If "YES" in step S2, the display control block 245 immediately ends the page forward process. If the display control block 245 determines in step S2 that the display panel 250 does not display the last page of the musical score on the screen, in other words, if "NO" in step S2, the flow proceeds to step S3 in which the display control block 245 reads from the RAM (not shown), the next page of electronic musical score data, which are supplied to the display panel 250. Thus, the display panel 250 displays the next page of the musical score on the screen.

The aforementioned description is made with respect to the case where the word "TUGI" for designating the next page of the musical score is input to the player piano 200. Similar operations and processes are made with respect to another case where the word "MAE" for designating the previous page of the musical score is input to the player piano 200.

According to the player piano 200 of the present embodiment described above, when the user speaks the prescribed keyword toward the microphone 220, the display panel 250 correspondingly changes over images of the musical score being displayed on the screen. Therefore, even when the user plays the player piano 200 with both of his/her hands, the user is able to change over the images on the screen of the display panel 250 without intermittently breaking musical performance on the player piano 200. Thus, the user is able to concentrate his/her mind on the musical performance of the player piano 200.

The present embodiment originally describes that the display panel 250 merely displays images of the electronic musical score data on the screen. In this case, the display panel 250 is not necessarily designed to display control buttons for the user's manual operations together with the musical score on the screen. For this reason, even if the display panel 250 employs the same size of screen being conventionally used, it is possible to broaden the overall area for displaying the musical score on the screen compared with conventional displays.

(3) Modified Examples
(a) First Modified Example

The first embodiment originally describes that images of electronic musical score data being displayed on the screen of the display panel 250 are changed over in response to human voices (or user's voice commands). Instead of changing over the images of the electronic musical score data, it is possible to change over sizes and shapes of staves and musical symbols of the musical score on the screen in response to the human voices. Concretely speaking, it is possible to provide a magnification function by which images of electronic musical score data can be magnified by prescribed factors (which range between '1' and '10', for example) on the screen, and it is possible to provide a division function (or screen split function) by which images of electronic musical score data can be divided into multiple sections being arranged in a vertical direction on the screen. For example, an image of the electronic musical score data is divided into two sections, which are respectively displayed in an upper area and a lower area on the screen. In order to facilitate the aforementioned functions, the word dictionary 242a of the voice recognition block 242 and the command database 244 register a word "zoom" for designating magnification of images of the electronic musical score data and a Japanese word ブンカツ or "BUNKATSU" (i.e., "divide" in English) for designating division of images of the electronic musical score data. In addition, the command database 244 also registers a command 'EXPAND' in relation with the word "zoom" and a command 'DIVIDE' in relation with the word "BUNKATSU". Thus, the user is able to freely change over the sizes and shapes of the electronic musical score data on the screen of the display panel 250 by his/her voice commands.

(b) Second Modified Example

The first embodiment originally describes that the electronic musical score data are configured by the performance information 'a', tempo information 'b' and title information 'c' (see FIG. 4). It is possible to additionally introduce a practice mark 'd', which is displayed at an arbitrary position within the area of the performance information 'a' on the screen.

Figure 6:
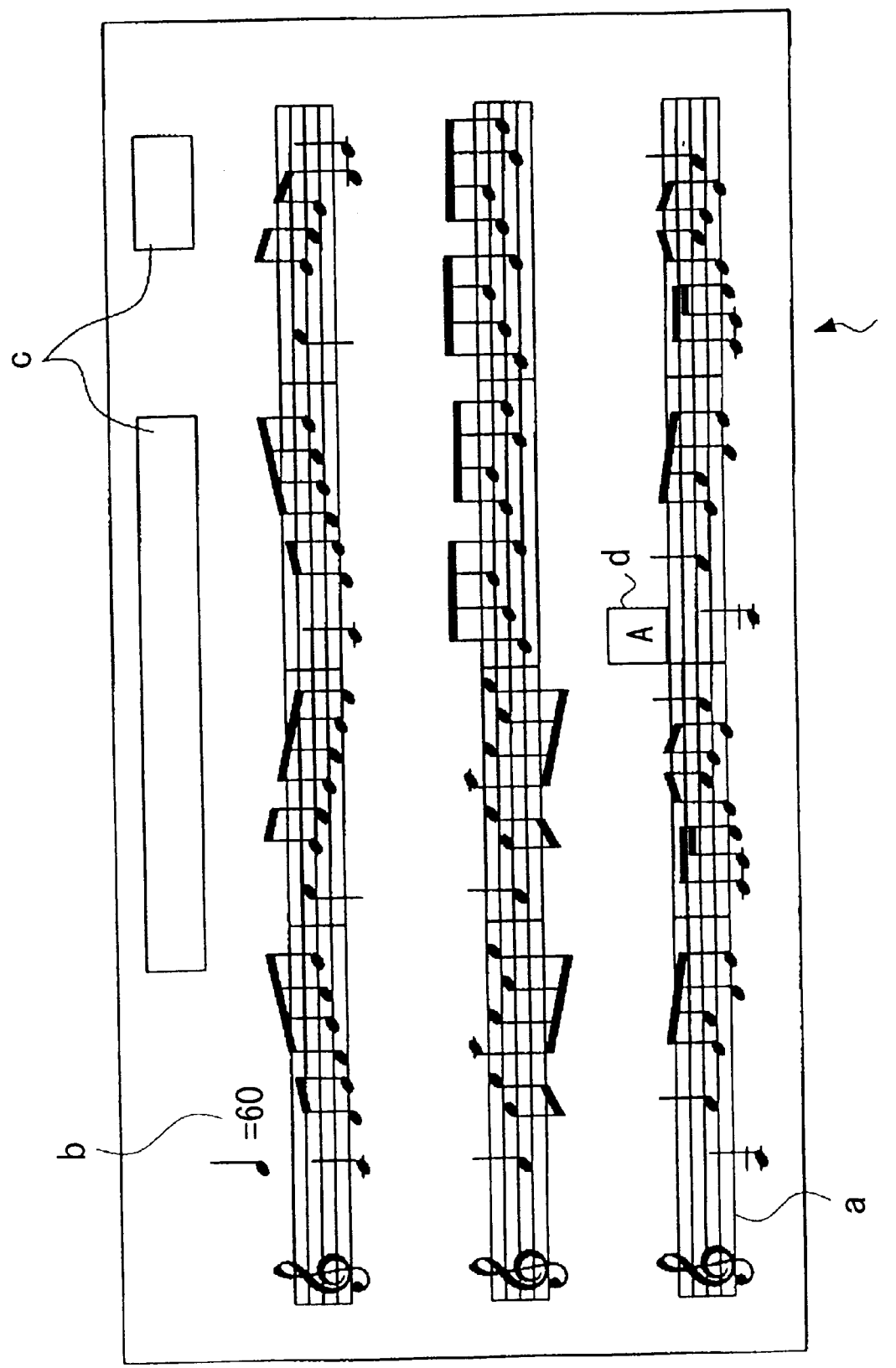
FIG. 6 shows an example of an image of a prescribed page of electronic musical score data incorporating a practice mark on the screen.

Concretely speaking, the controller 240 incorporates a practice mark write tool, which operates responsive to user's manual operation of the operator console. That is, by manually operating the operator console, the user is able to display a practice mark 'd' at an arbitrary position within the area of the performance information 'a' on the screen. FIG. 6 shows that a letter 'A' is displayed as the practice mark 'd' above a lowest staff within three staves of the performance information 'a' on the screen. Incidentally, the practice mark 'd' is not necessarily limited to one prescribed symbol such as the letter 'A'. Therefore, it is possible to provide plural symbols such as letters 'A' and 'B' as the practice mark 'd'. In addition, it is possible to arbitrarily add or delete the practice mark d on the screen.

To realize incorporation of the practice mark d, the word dictionary 242a of the voice recognition block 242 and the command database 244 register a word "MARK A" for designating the practice mark 'A' to be incorporated into the electronic musical score data being displayed on the screen. In addition, the command database 244 also registers a command 'JUMP A' in relation with the word "MARK A".

If the controller 240 is configured to incorporate the practice mark write tool described above, the user can instruct the display panel 250 to display images of electronic musical score data together with the practice mark 'A' on the screen at any time. Concrete operations will be described below.

Suppose that the display panel 250 initially displays an image of electronic musical score data of page 10, which differs from an image of electronic musical score data of page 2 incorporating a practice mark 'A', on the screen. In this case, when the user wishes to practice the prescribed part of the musical score with reference to the image of the electronic musical score data incorporating the practice mark 'A', the user speaks words "MARK A" toward the microphone 220 of the player piano 200. Inputting such words by means of the microphone 220, the command interpretation block 243 reads the command 'JUMP A' corresponding to the registered word "MARK A" from the command database 244, so that the corresponding command data is forwarded to the display control block 245. Based on the command data output from the command interpretation block 243, the display control block 245 supplies the electronic musical score data of page 2 incorporating the practice mark 'A' to the display panel 250. Thus, the display panel 250 automatically changes over images of the musical score on the screen from page 10 to page 2.

If the controller 240 is configured as described above, the user is able to display images of the electronic musical score data together with the practice mark on the screen by simple operations.

(c) Third Modified Example

The second modified example describes that the user manually operates the operator console to add a practice mark to the musical score on the screen. Of course, this technique is applicable to a system in which the user designates a position of a practice mark to be displayed on the screen by his/her voice. Concretely speaking, the word dictionary 242a and the command database 244 register the Japanese words "KAKIKOMI MODE" (i.e., "write mode" in English) for designating a changeover operation from an automatic performance mode to a practice mark write mode. In addition, the command database 244 also registers a command 'MODE WRITE' in relation with the words "KAKIKOMI MODE".

In order to designate a position of a practice mark to be displayed on the screen, the user speaks the words "KAKIKOMI MODE" toward the microphone 220 of the player piano 200. Thus, the player piano 200 is set in a practice mark write mode. To further designate the concrete position of the practice mark on the screen, the user speaks words "SHOSETSU BANGO 11" (i.e., "measure or bar number 11" in English) and "MARK A" toward the microphone 220. Herein, "11" that is spoken to follow "SHOSETU BANGO" is a serial number of the measure or bar that is counted from the first measure or bar within the musical score, while "A" that is spoken to follow "MARK" is an alphabetic letter that is selected from among plural practice marks A, B, . . . , for example. All of the aforementioned words and commands are registered in the word dictionary 242a and the command database 244 in advance. When the user speaks the words of "SHOSETSU BANGO 11" and "MARK A" toward the microphone 220 of the player piano 200, the controller 240 automatically inputs the prescribed command that instructs the display panel 250 to display a practice mark A at a position of measure number 11 on the screen. Thus, the display panel 250 additionally displays the practice mark A at the position of the measure number 11 of the musical score within the area of the performance information 'a' on the screen.

As described above, if the apparatus allows the user to designate the position of the practice mark on the screen by his/her voice, it is possible to additionally display the practice mark at the desired position within the musical score on the screen even if the user cannot presently use both of his/her hands because of progression of musical performance on the player piano 200, for example.

As described above, designation of the position of the practice mark on the screen can be made by the user's voice because the electronic musical score data do not originally designate the position of the practice mark in advance. Instead, designation of the position of the practice mark can be made using a prescribed format of the electronic musical score data by which the practice mark is added to the performance information 'a' so that it is automatically displayed at the prescribed position on the screen. In that case, the user is also able to change over images of the musical score on the screen by his/her voice.

Suppose that a practice mark A is added to the electronic musical score data at measure number 33 which appears on page 3 of the musical score, for example. In this case, when the user speaks the words "MARK A" toward the microphone 220 of the player piano 200, the display panel 250 automatically displays on the screen, the musical score of page 3 in which the practice mark A has been already displayed at the prescribed position. In order to facilitate an image changeover with respect to the musical score of the prescribed page incorporating the practice mark A on the screen, it is necessary to provide the user with information regarding the position of the practice mark A within the musical score. In order to do so, it is possible to display the measure number and page of the musical score, to which the practice mark A is added, in the area of the title information 'c' on the screen.

(d) Fourth Modified Example

The third modified example described the configuration of the apparatus in which the display panel 250 automatically displays an image of the electronic musical score data of the prescribed page, which is specified by the practice mark and measure number. Instead, it is possible to directly input a voice command for designating the specific page of the electronic musical score data incorporating the practice mark.

(e) Fifth Modified Example

The second and third modified examples describe that images of electronic musical score data of multiple pages are changed over on the screen with reference to the practice mark. Instead, it is possible to change over images of electronic musical score data of multiple pages on the screen with reference to the measure number (i.e., the serial number of the measure that is counted from the first measure of the musical score of the musical tune), which is designated by the user. As described before, the display panel 250 displays in the area of the title information c on the screen, information indicating the number of the measure that is counted from the first measure of the musical score of the musical tune and is being presently played by the user. This information is very useful for the user, particularly in the practice of the musical performance on the player piano 200. That is, the user memorizes the number of the measure (e.g., measure number '11') of the musical score at which the user frequently makes errors, in spite of repeatedly practicing many times. Therefore, the user can easily instruct the display panel 250 to display the prescribed page of the electronic musical score data incorporating the practice mark by designating the memorized measure number. Incidentally, the aforementioned fifth modified example that allows the user to change over the pages of the electronic musical score data by designating the measure numbers can be easily actualized using the same configuration of the controller 240 employed in the first modified example, hence, the description of the controller 240 for use in the fifth modified example is omitted in the present specification.

(6) Sixth Modified Example

The first embodiment and its modified examples describe that pages of electronic musical score data are changed over on the screen in response to the user's voice. In the case where the pre-recorded musical performance is reproduced on the player piano 200 in the automatic performance mode and the like, it is possible to change over positions of reproduction of the musical performance in response to changeovers of pages of the musical score being displayed on the screen. This function can be actualized by providing a reproduction position control block subsequent to the command interpretation block 243. The reproduction position control block makes a determination as to which part of the performance data is to be reproduced on the basis of the command data output from the command interpretation block 243. In response to the determination result, the reproduction position control block outputs control data to the electronic musical tone generator 222, so that the reproduction position is to be changed over in the musical score. Based on the control data, the electronic musical tone generator 222 generates musical tones, by which the musical performance is reproduced in accordance with the electronic musical score data whose pages are successively changed over on the screen. In the reproduction of the performance data described above, the electronic musical tone generator 222 is controlled by the control data. In the automatic performance that is realized with sequential changeovers of pages of the electronic musical score data on the screen, the servo controller 212 is to be controlled based on the control data. Because the automatic performance can be easily realized by partially modifying the reproduction of the performance data, details of the automatic performance on the player piano 200 are omitted in the present specification.

[B] Second Embodiment (1) Configuration of Embodiment

The first embodiment is designed such that the controller 240 performs display controls on the electronic musical score data in response to the user's voice commands. The second embodiment is designed such that a controller 240a performs display controls on the electronic musical score data in response to words of a song which are actually sung by the user. The second embodiment employs the same hardware configuration of the player piano 200 shown in FIG. 2, hence, the description thereof will be omitted.

Figure 7:
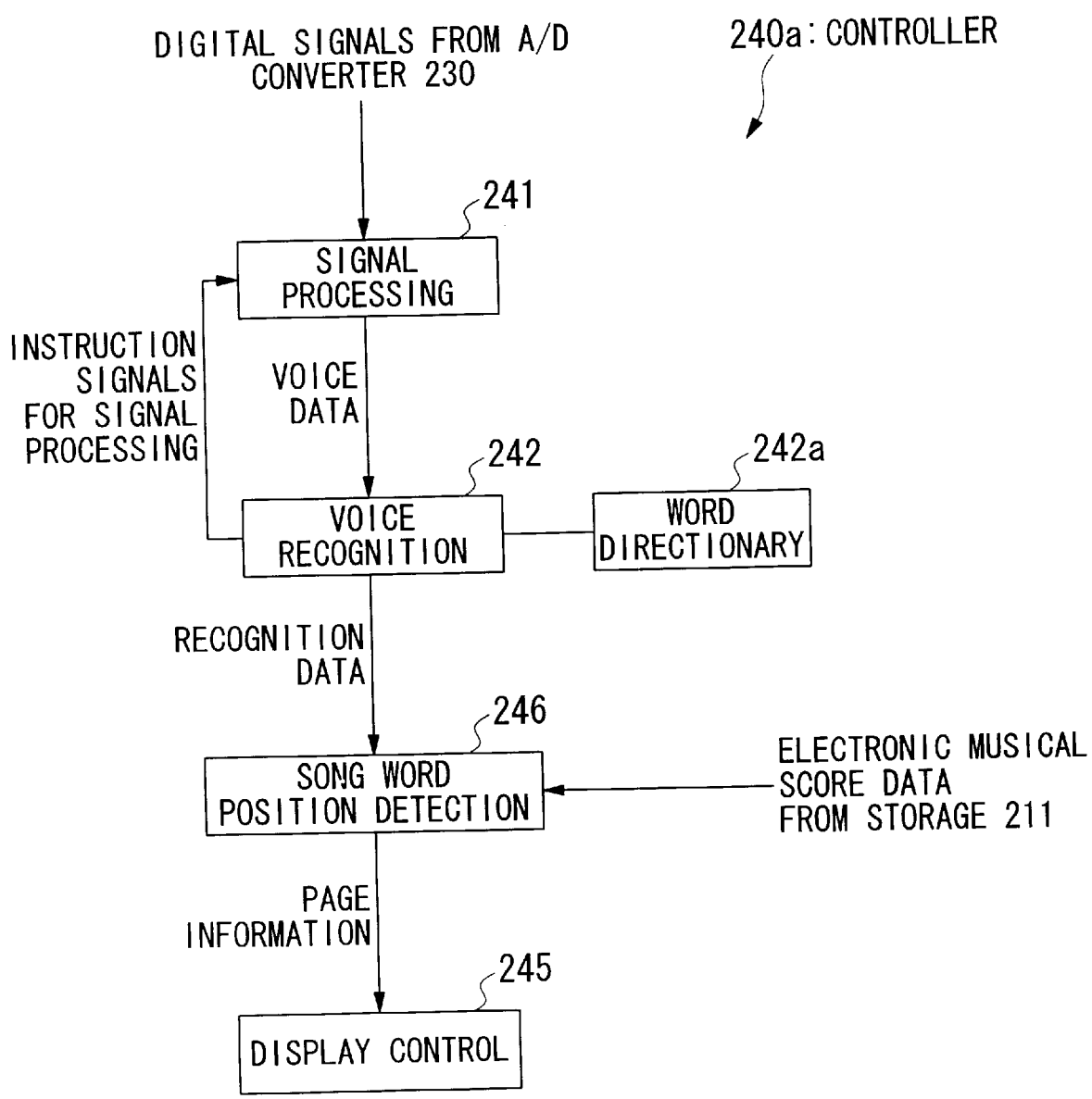
FIG. 7 is a simplified block diagram showing function blocks realized in a controller in accordance with a second embodiment of the invention.

FIG. 7 shows function blocks for use in the controller 240a in accordance with the second embodiment. As compared with the first embodiment shown in FIG. 3, the controller 240a additionally provides a song word position detection block 246, which is substituted for the aforementioned command interpretation block 243 and the command database 244.

The song word position detection block 246 operates responsive to words of a song of a musical tune that are sequentially sung by the user on the microphone 220. Based on the electronic musical score data being transferred from the storage unit 211, the song word position detection block 246 detects a position of the song containing plenty of words (or phonemes) one of which presently matches with the word (or phoneme) of the song that is presently produced from the user's mouth and is picked up by the microphone 220. Then, the song word position detection block 246 outputs a detection result to the display control block 245. In the above, the song word detection block 246 performs retrieval on the electronic musical score data to find out the position of the song presently matched with the word of the song actually produced from the user's mouth. Herein, the electronic musical score data are described in a table form, an example of which will be described with reference to FIG. 8.

Figures 8, 9:
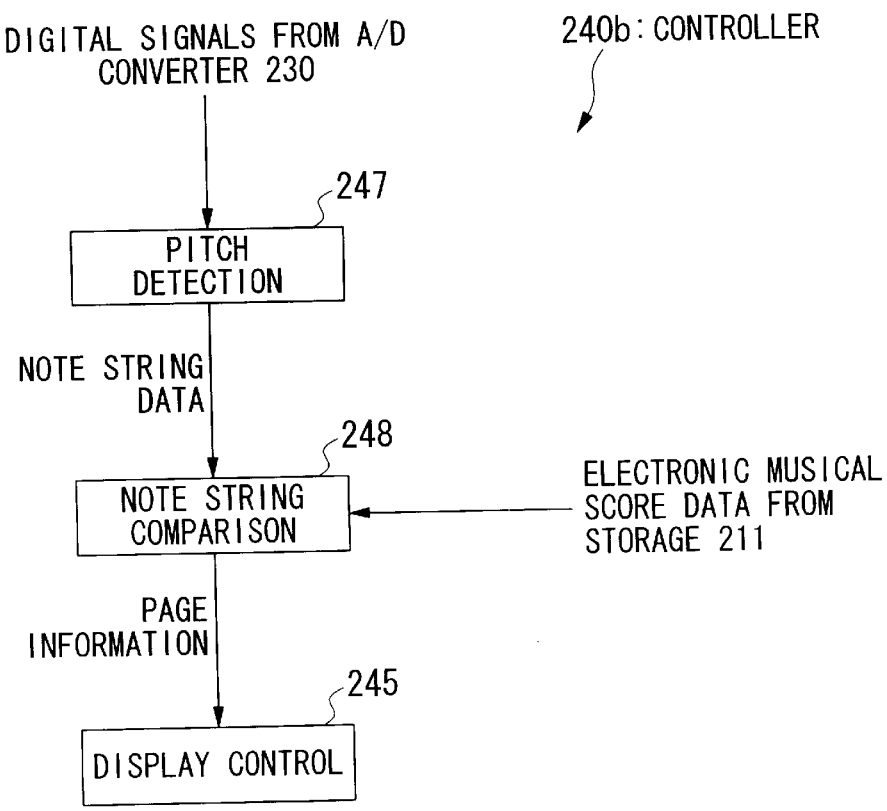
FIG. 8 shows an example of a configuration of electronic musical score data that are used in the second embodiment.
FIG. 9 is a simplified block diagram showing function blocks realized in a controller in accordance with a modified example of the second embodiment.

FIG. 8 shows a main portion of the configuration of the electronic musical score data. Herein, the electronic musical score data are configured by multiple sets of data, namely interval data, rhythm data, song data and page data. Other than these data, the electronic musical score data also contain data representing the title of the musical tune, name of the composer, name of the metrician, etc., which are not closely related to the present invention, hence, the description thereof will be omitted.

The interval data expresses seven musical intervals for solfa syllables 'do' (C) to 'si' (B) by numbers, wherein '0' is allocated to 'do', and semitone is expressed using the number '1'. In the musical scale, 'do' sharp (#) that is a semitone higher than 'do' is expressed by the number '1', and 're' that is a semitone higher than 'do' sharp is expressed by '2', for example. In addition, a symbol '+' is used to express one octave higher than the reference note in the certain musical scale, and a symbol '−' is used to express one octave lower than the reference note in the certain musical scale. Those symbols are written in the left positions of the numbers showing the intervals (or notes). For example, '+1' indicates a note of 'do' sharp that is one semitone and one octave higher than the reference note 'do'.

The rhythm data are expressing using units of quarter-note lengths, wherein one quarter-note length is expressed by the number '1'. For example, '0.5' expresses a half of the quarter note, namely an eighth note, and '4' expresses a whole note corresponding to a sum of four quarter notes.

The song data are created in the text form that describes an arrangement of words (or syllables) in the prescribed order, wherein the words are described at the prescribed positions in connection with the pitch data and rhythm data respectively. FIG. 8 shows Japanese syllables such as ラララ (i.e., "la la la . . . " in English).

The page data shows a number of the page of the electronic musical score data to which the pitch data, rhythm data and song data presently belong.

Incidentally, the electronic musical score data are not necessarily described in the aforementioned format shown in FIG. 8. Hence, it is possible to use pitch data instead of the interval data.

(2) Operations of Second Embodiment

Next, a description will be given with respect to operations of the second embodiment. Herein, the description is made in consideration of the situation where the user sings a song on the microphone 220 of the player piano 200 while the display panel 250 sequentially changes over images of electronic musical score data on the screen in the automatic performance mode.

When the user 220 sings a song on the microphone 220 while pronouncing words of the song by each of syllables, the controller 240a starts voice recognition processes.

Suppose that the user presently pronounces a word of the song of "TONAKAI" (i.e., "reindeer" in English), which is made up of four Japanese syllables, on the microphone 220.

The aforementioned user's voice is input to the player piano 200 by means of the microphone 220 and A/D converter 230, so that the corresponding voice data are supplied to the voice recognition block 242 by means of the signal processing block 241. The voice recognition block 242 performs phoneme analysis (or syllable analysis) on the input voice data to provisionally determine an arrangement of phonemes (or syllables), which is compared with words that are registered in the word dictionary 242a in advance. Then, the voice recognition block 242 chooses a word having the highest degree of match. In the second embodiment, the word dictionary 242a of the voice recognition block 242 registers a variety of words, which are used for various songs, in addition to the prescribed words that are related to the prescribed controls of the player piano 200. Therefore, the voice recognition block 242 produces recognition data representing the word "TONAKAI" that is determined based on the phoneme analysis result. The recognition data are supplied to the song position detection block 246.

Receiving the recognition data from the voice recognition block 242, the song position detection block 246 refers to electronic musical score data that are transferred thereto from the storage unit 211. Herein, the song position detection block 246 performs retrieval as to which part of the song listed in the electronic musical score data matches the word "TONAKAI" that is pronounced by the user and is represented by the recognition data. As described before, the electronic musical score data contain page data representing pages to which the interval data, rhythm data and song data belong. Based on the page data, the song word position detection block 246 can determine which page of the musical score the corresponding word of the song is written. Based on the determination result, the song word position detection block 246 performs recognition of which page of the musical score the word "TONAKAI" is written. The recognition result is supplied to the display control block 245 as page information. If the song word detection block 246 recognizes that the word "TONAKAI" is written on page 2 of the musical score, it outputs page information for controlling the display control block 245 to display electronic musical score data of page 2 on the screen.

In the aforementioned condition, the display control block 245 reads the electronic musical score data of page 2 from the RAM on the basis of the page information output from the song word position detection block 246. The read electronic musical score data are supplied to the display panel 250. As a result, the display panel 250 displays on the screen, page 2 of the musical score in which the word "TONAKAI" is written.

As described above, the player piano 200 of the second embodiment allows the user to designate the desired position of the musical score being displayed on the screen by pronunciation (or uttering) of words of the song. Of course, it is possible to simply change over pages of the musical score on the screen in response to user's pronunciation of words of the song. In addition, it is possible to modify the second embodiment similarly to the sixth modified example of the first embodiment. That is, when the player piano reproduces a musical performance by the automatic performance function thereof, it is possible to automatically change over the reproduction positions of the musical performance in response to changeovers of pages of the musical score on the screen. Concretely speaking, a reproduction position control block is provided subsequent to the song word position detection block 246. Herein, the reproduction position control block makes a determination as to which part of the musical score is to be reproduced based on the page information output from the song word position detection block 246. Then, the reproduction position control block produces control data in response to the determination result. The control data are supplied to the electronic musical tone generator 222 to enable changeovers of the reproduction positions in the musical score. Based on the control data, the electronic musical tone generator 222 generates musical tones, by which electronic musical score data of the prescribed page are automatically reproduced. That is, the electronic musical tone generator 222 is controlled to reproduce the prescribed page of the electronic musical score data by the speaker(s) and the like. Instead, it is possible to control the servo controller 212 to realize automatic performance (or auto play of the player piano) on the prescribed page of the electronic musical score data. Details of the automatic performance of the player piano are omitted because it can be easily realized similarly to the electronic reproduction of the electronic musical score data.

(3) Modified Examples

The second embodiment describes a player piano that is configured to control images of electronic musical score data being displayed on the screen in response to user's pronunciation of words of a song. Herein, the user is not always required to sing a song such that each of the words (or syllables) is clearly pronounced on the microphone 220. That is, the player piano can be designed to respond to somewhat 'unclear' and 'informal' manners of singing such as humming. That is, the player piano can be modified to control images of electronic musical score data being displayed on the screen upon detection of pitches of devoiced sounds that are produced by the user in humming.

FIG. 9 shows function blocks for use in a controller 240*b* in accordance with a modified example of the second embodiment. That is, the controller 240*b* contains a pitch detection block 247, a note string comparison block 248 and a display control block 245.

The pitch detection block 247 inputs devoiced sounds, which are produced by the user humming a song or a melody, by means of the microphone 220 and A/D converter 230. Herein, the pitch detection block 247 extracts pitches from the devoiced sounds of the user in humming, so that it forms a string of the extracted pitches (hereinafter, simply referred to as an extracted pitch string).

The pitch detection block 247 further converts the extracted pitch string to the prescribed data form that the note string comparison block 248 can uniquely interpret, for example, the data form that is equivalent to the form of the electronic musical score data. Thus, the pitch detection block 247 produces pitch string data, which are forwarded to the note string comparison block 248.

Based on the electronic musical score data (specifically, the interval data) that are transferred from the storage unit 211, the pitch string comparison block 248 performs retrieval of the part of the electronic musical score data which matches the pitch string data output from the pitch detection block 247, and it also performs retrieval of the page of the musical score on which the pitch string is written. Retrieval results are supplied to the display control block 245 as page information.

According to the aforementioned configuration of the controller 240*b*, as the user's devoiced sounds in humming are input to the player piano by means of the microphone 220 and A/D converter 230, a string of pitches are sequentially extracted from the user's devoiced sounds. Upon detection of the pitch string of the electronic musical score data that matches the extracted pitch string, the controller 240*b* automatically changes over the pages of the musical score on the screen. Incidentally, concrete operations for detecting the pitches from the user's devoiced sounds in humming can be understood by the description of the second embodiment, and the description thereof will therefore be omitted. In addition, it is possible to further modify the controller 240*b* such that reproduction positions are automatically changed over in response to changeovers of pages of the musical score on the screen, which have been already described in the description of the second embodiment.

[C] Third Embodiment (1) Configuration of Third Embodiment

The player piano of the second embodiment and its modified example is designed to control changeovers of images of electronic musical score data on the screen and reproduction of musical performance in response to the user's voices corresponding to words of a song or the user's devoiced sounds in humming. In contrast, the player piano of the third embodiment is designed to set a tempo for the musical performance based on the electronic musical score data by user's voices for counting numbers and the like. For example, when the user speaks "one", "two", "three" and "hi !", the player piano automatically sets a certain tempo for the musical performance. In the present embodiment, the aforementioned voices such as "one", "two", "three" and "hi !" will be referred to as count voices.

Figure 10:
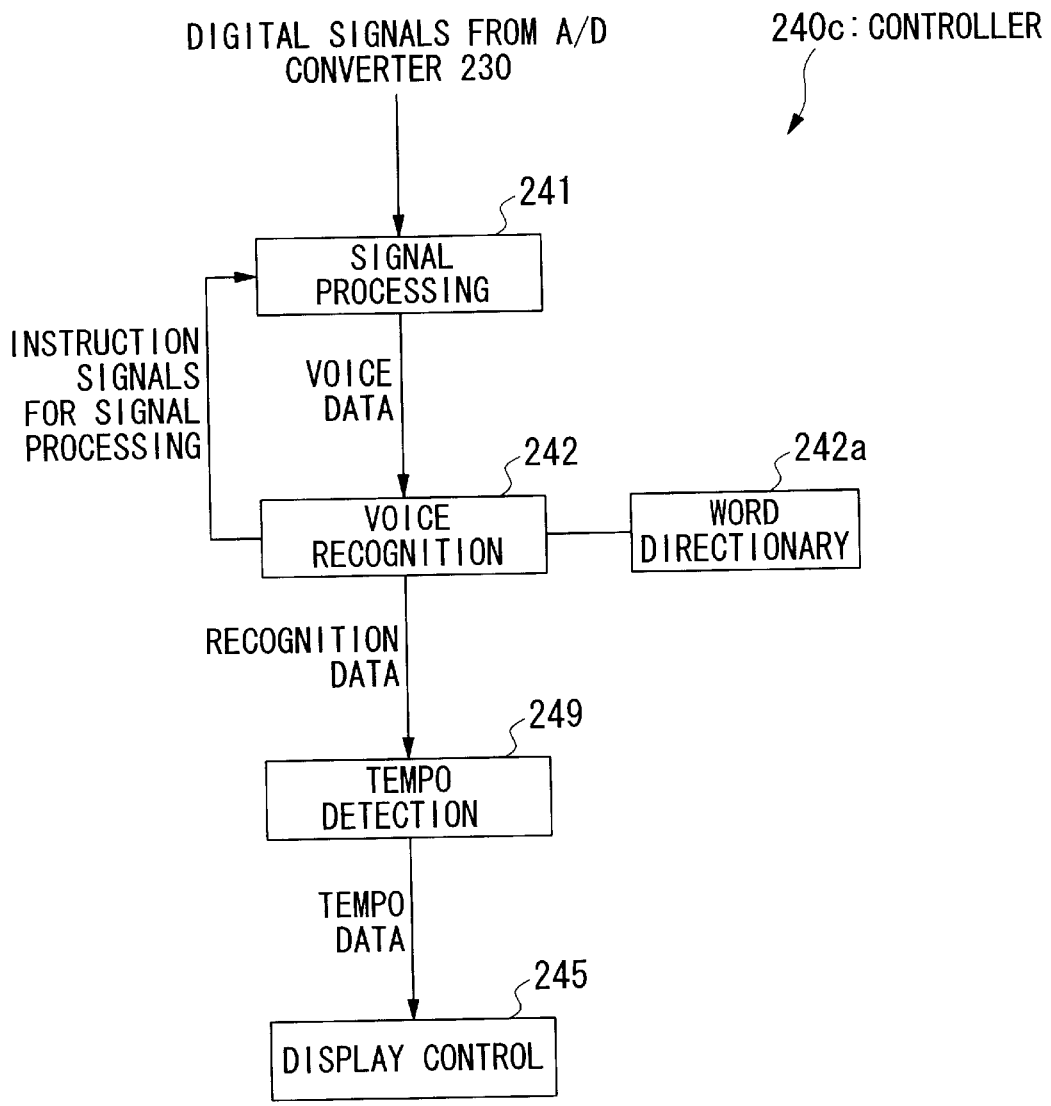
FIG. 10 is a simplified block diagram showing function blocks realized in a controller in accordance with a third embodiment of the invention.

FIG. 10 shows function blocks for use in a controller 240c in accordance with the third embodiment. As compared with the foregoing controller 240 shown in FIG. 3, the controller 240c is characterized by providing a tempo detection block 249 between the voice recognition block 242 and display control block 245.

When the user pronounces the count voices on the microphone 220, the corresponding voice data are sent to the voice recognition block 242, which in turn produces recognition data representing the count voices. The recognition data are forwarded to the tempo detection block 249. The tempo detection block 249 calculates a tempo based on the reception timing of the recognition data. The calculated tempo is supplied to the display control block 245 as tempo data.

The voice recognition block 242 also inputs other voices (such as the word "start" for designating a start of musical performance) other than the count voices by means of the microphone 220 and A/D converter 230. The voice recognition block 242 installs a voice type discrimination function for making a determination as to whether the input voices correspond to the count voices (i.e., "one, two, three, hi !") or the other voices. If the voice recognition block 242 determines that the input voices correspond to the count voices, it outputs the corresponding recognition data to the tempo detection block 249. If the voice recognition block 242 determines that the input voices correspond to the other voices, it outputs the corresponding recognition data to the command interpretation block 243 (not shown in FIG. 10).

(2) Operations of Third Embodiment

Figure 11:
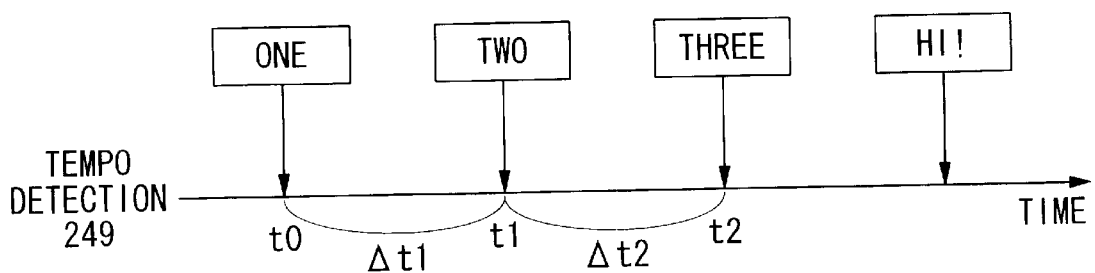
FIG. 11 is a time chart that is used to explain operations of the controller of the third embodiment in which count voices are input to the player piano.
Figure 12:
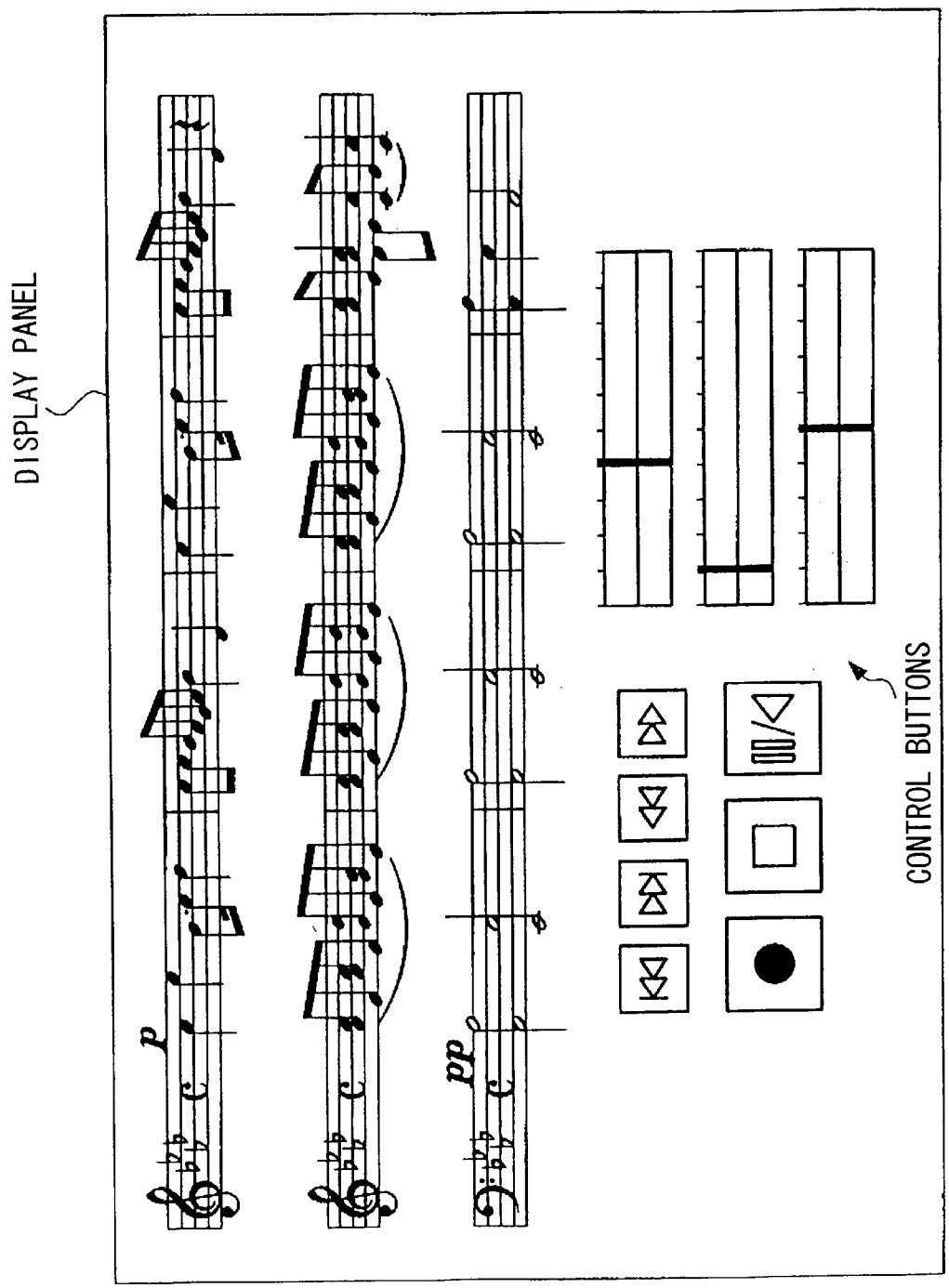
FIG. 12 shows an example of an image of electronic musical score data that are displayed on the screen.

Next, operations of the player piano of the third embodiment in which count voices are input will be described with reference to FIG. 11.

In order to set a desired tempo for musical performance on the player piano, the user sequentially pronounces the count voices such as "one", "two", "three" and "hi !" toward the microphone 220. The count voices are input to the player piano by means of the microphone 220 and A/D converter 230. In the controller 240c, the signal processing block 241 converts the input count voices to voice data, which are sequentially input to the voice recognition block 242. The voice recognition block 242 makes a determination as to whether the voice data correspond to the count voices or other voices.

The determination is actualized by activating the voice type discrimination function in the voice recognition block 242. If the voice recognition block 242 determines that the input voices correspond to the count voices, it supplies the corresponding recognition data to the tempo detection block 249.

In the above, the voice recognition block 242 actually produces a series of four recognition data in response to four words included in the count voices, i.e., "one" "two", "three" and "hi !", which are sequentially input thereto. Upon receipt of the first recognition data (corresponding to the word "one"), the tempo detection block 249 refers to a timer (not shown) to read a time (T=t0) at which it receives the first recognition data. Time data representing the read time is stored in a prescribed area of a specific storage (not shown). Sequentially receiving the second and third recognition data (corresponding to the words "two" and "three" respectively), the tempo detection block 249 reads respective times (T=t1, t2), at which it receives the second and third recognition data respectively, from the timer. Time data representing the respective read times are stored in the prescribed area of the storage. In addition, when receiving the third recognition data, the tempo detection block 249 calculates a tempo 'T(temp)' for musical performance on the player piano. That is, the performance tempo T(temp) is to be calculated by four steps as follows:

$$\Delta t1 = t1 - t0$$

$$\Delta t2 = t2 - t1$$

$$\Delta t(ave) = \frac{\Delta t1 + \Delta t2}{2}$$

$$T(temp) = \frac{60}{\Delta t(ave)}$$

The tempo detection block 249 performs calculations based on times, which are needed for inputting the prescribed keywords such as "one", "two" and "three" for use in setup of the tempo. Through the calculations, the tempo detection block 249 produces the performance tempo T(temp), which is forwarded to the display control block 245 as tempo data. Upon receipt of the tempo data, the display control block 245 provides electronic musical score data whose tempo is set by the tempo data to the display panel 250. Thus, the display panel 250 displays the tempo information b on the screen (see FIG. 4) in response to the tempo data, which is set by the user's count voices. For example, the display panel 250 displays on the screen, the performance tempo showing one-hundred-and-twenty quarter notes to be played per minute. When receiving the fourth recognition data (corresponding to the word "hi !"), the display control block 245 starts flashing the note(s) that should be played in response to the tempo information b which is set by the user's count voices.

As described above, the player piano of the third embodiment is designed to change over the tempo information b on the screen in response to the speed at which the user sequentially pronounces the count voices on the microphone 220. Of course, the third embodiment can be designed as similarly to the aforementioned second embodiment. That is, during reproduction of the musical performance in the automatic performance mode, it is possible to switch over the reproduction tempo in response to changeovers of images of electronic musical score data being displayed on the screen. Concretely speaking, a reproduction control block is provided subsequent to the tempo detection block 249. The reproduction control block plays a role of controlling the reproduction velocity for the musical performance based on the tempo data output from the tempo detection block 249. Under the control of the reproduction control block, the electronic musical tone generator 222 generates musical tones. Thus, it is possible to actualize reproduction of the musical performance at the tempo that is set in response to the user's count voices.

As described above, the tempo setup process of the third embodiment can be applied to the reproduction of the musical performance in the automatic performance mode of the player piano. In addition, it can be also applied to the 'full' reproduction in which the musical tune is to be fully reproduced from the top part thereof in the automatic performance mode.

That is, the user operates the operator console to select a musical tune that is subjected to full reproduction, and then the user pronounces the count voices such as "one", "two", "three" and "hi !" toward the microphone 220 so as to set a desired performance tempo. In this case, the last word "hi !" triggers the full reproduction to be started, so that the automatic performance is started with the performance tempo, which is set in response to the user's count voices. In other words, the user is able to start the automatic performance without pronouncing the prescribed voice command (such as the word "start"), which designates a start of the automatic performance, toward the microphone 220.

The player piano of the third embodiment is designed to set the performance tempo in response to the user's count voices. Herein, the count voices are not necessarily used to uniquely determine the performance tempo. That is, it is possible to use the count voices for determination of the tone volume in the reproduction of the musical performance. Concretely speaking, a tone volume detection block is provided subsequent to the voice recognition block 242. Herein, the tone volume level of the user's count voices is detected and is compared with prescribed levels, namely level 1 to level 20, for use in evaluation of the tone volume. That is, the tone volume detection block makes a determination as to which level within level 1 to level 20 matches with the detected tone volume level of the user's count voices. The determination result is supplied to the reproduction control block as tone volume data. In this case, the reproduction control block plays two roles in controlling the reproduction. First, the reproduction control block controls the reproduction velocity based on the tempo data output from the tempo detection block 249. In addition, it also controls the tone volume for reproduction based on the tone volume data output from the tone volume detection block. Under the control of the reproduction control block, the electronic musical tone generator 222 generates musical tones. Thus, it is possible to reproduce the musical tune in response to the performance tempo and tone volume, which are set in response to the user's count voices. The aforementioned operations can be similarly applied to the auto play mode in which the player piano plays an automatic performance based on the performance data. Herein, the reproduction control block controls the servo controller 212 instead of the electronic musical tone generator 222, hence, the description thereof will be omitted.

Lastly, the present invention is not necessarily applied to player pianos. Hence, it can be similarly applied to other musical instruments such as violins. In addition, it can be similarly applied to electronic devices such as personal computers other than the musical instruments.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A musical score display apparatus comprising:

a voice input device for inputting a voice of a user;

a voice recognition device for recognizing the input voice to produce voice recognition information; and a controller for if the voice recognition information corresponds to a command that designates a position of a musical score which is displayed on a screen of a display based on electronic musical score data, controlling the display to display an image of the musical score containing the designated position on the screen.

2. A musical score display apparatus comprising:

a voice input device for inputting a voice of a user;

a voice recognition device for recognizing the input voice to produce voice recognition information;

a storage device for storing song word data, which represent words of a song of a musical tune, and song word position data, which designate positions of the words in a musical score that is displayed on a screen of a display based on electronic musical score data, in relation with each other;

a song word position detection device for comparing the voice recognition information with the words listed in the song word data respectively, so that the song word position detection device outputs the song word position data corresponding to the song word data representing a word that presently matches the voice recognition information as song word position information; and a controller for controlling the display to display an image of the musical score corresponding to the position designated by the song word position information on the screen.

3. A musical score display apparatus comprising:

a voice input device for inputting voices of a user;

a pitch detection device for sequentially detecting pitches of the voices to output pitch string information representing a string of the detected pitches of the voices;

a storage device for storing pitch data of notes included in a musical score that is displayed on a screen of a display based on electronic musical score data;

a comparator for comparing the pitch string information with the pitch data stored in the storage device to determine a position of the musical score that should be displayed on the screen in response to the user's voices, so that the comparator outputs position information representing the determined position of the musical score to be displayed on the screen; and a controller for controlling the display to display an image of the musical score corresponding to the determined position on the screen based on the position information.

4. A musical performance apparatus comprising:

a voice input device for inputting a voice of a user;

a voice recognition device for recognizing the input voice to produce voice recognition information; and a controller for starting reproduction of musical performance from a reproduction position designated by a command that is included in musical tune data and that corresponds to the voice recognition information.

5. A musical performance apparatus comprising:

a voice input device for inputting a voice of a user;

a voice recognition device for recognizing the input voice to produce voice recognition information;

a storage device for storing song word data, which represent words of a song within musical tune data, and song word position data, which designate positions of the words in a musical score that is displayed on a screen of a display based on electronic musical score data, in relation with each other;

a song word position detection device for comparing the voice recognition information with the words listed in the song word data respectively, so that the song word position detection device outputs the song word position data corresponding to the song word data representing a word that presently matches the voice recognition information as song word position information; and a controller for executing musical performance based on the musical tune data in response to a song word position designated by the song word position information.

6. A musical score display apparatus comprising:

a voice input device for inputting voices of a user;

a pitch detection device for sequentially detecting pitches of the voices to output pitch string information representing a string of the detected pitches of the voices;

a storage device for storing pitch data of notes of musical tune data included in a musical score that is displayed on a screen of a display based on electronic musical score data;

a comparator for comparing the pitch string information with the pitch data stored in the storage device to determine a position of the musical score that should be displayed on the screen in response to the user's voices, so that the comparator outputs position information representing the determined position of the musical score to be displayed on the screen; and a controller for executing musical performance based on the musical tune data in response to the determined position of the musical score designated by the position information.

7. A musical performance apparatus comprising:

a voice input device for inputting a voice of a user;

a tone volume detection device for detecting a tone volume of the input voice to produce tone volume information; and a controller for executing musical performance based on musical tune data in response to the tone volume information.

8. A musical performance apparatus comprising:

a voice input device for inputting a voice of a user;

a voice recognition device for recognizing the input voice to produce voice recognition information;

a time detection device for detecting a time that is needed for inputting a prescribed keyword corresponding to the voice recognition information;

a tempo determination device for determining a tempo for musical performance based on musical tune data based on the time detected by the time detection device, thus outputting tempo information; and a controller for executing the musical performance based on the musical tune data in response to the tempo designated by the tempo information.

9. A musical score display method comprising the steps of:

inputting a voice of a user;

recognizing the input voice to produce voice recognition information; and if the voice recognition information corresponds to a command that designates a position of a musical score which is displayed on a screen of a display based on electronic musical score data, controlling the display to display an image of the musical score containing the designated position on the screen.

10. A musical score display method comprising the steps of:

inputting a voice of a user;

performing signal processing on the input voice to produce voice data;

performing phoneme analysis on the voice data to determine an arrangement of phonemes that is included in the input voice and that highly matches a word listed in advance in a word dictionary;

creating recognition data based on the determined arrangement of the phonemes;

interpreting the recognition data as one of prescribed commands that are listed in advance in a command database; and controlling a display to display a desired image of electronic musical score data on a screen in response to the command corresponding to the recognition data.

11. A musical score display method according to claim 10 further comprising the steps of:

detecting a tone volume of the input voice; and automatically controlling musical performance based on the electronic musical score data in response to the detected tone volume.

12. A musical score display method according to claim 10 further comprising the steps of:

detecting a tempo in response to a time that is needed for inputting the voice; and automatically setting the tempo to musical performance based on the electronic musical score data.

13. A musical score display method according to claim 11 or 12 wherein the musical performance is automatically executed by electronically generating musical tones based on the electronic musical score data.

14. A musical score display method according to claim 11 or 12 wherein the musical performance is automatically executed by driving keys of a player piano based on the electronic musical score data.

15. A machine-readable media storing programs that causes a computer coupled with a display to perform a musical score display method comprising the steps of:

inputting a voice of a user;

recognizing the input voice to produce voice recognition information; and if the voice recognition information corresponds to a command that designates a position of a musical score which is displayed on a screen of the display based on electronic musical score data, controlling the display to display an image of the musical score containing the designated position on the screen.

16. A machine-readable media storing programs that causes a computer coupled with a display to perform a musical score display method comprising the steps of:

inputting a voice of a user;

performing signal processing on the input voice to produce voice data;

performing phoneme analysis on the voice data to determine an arrangement of phonemes that is included in the input voice and that highly matches a word listed in advance in a word dictionary;

creating recognition data based on the determined arrangement of the phonemes;

interpreting the recognition data as one of prescribed commands that are listed in advance in a command database; and controlling the display to display a desired image of electronic musical score data on a screen in response to the command corresponding to the recognition data.

* * * * *